W. B. PAYNE.
CHECK WRITER.
APPLICATION FILED MAR. 4, 1919.

1,389,214.

Patented Aug. 30, 1921.
9 SHEETS—SHEET 1.

INVENTOR
Walter B. Payne
BY
ATTORNEY

W. B. PAYNE.
CHECK WRITER.
APPLICATION FILED MAR. 4, 1919.

1,389,214.

Patented Aug. 30, 1921.
9 SHEETS—SHEET 2.

INVENTOR
Walter B. Payne
BY
ATTORNEY

UNITED STATES PATENT OFFICE.

WALTER B. PAYNE, OF ROCHESTER, NEW YORK, ASSIGNOR TO TODD PROTECTOGRAPH COMPANY, OF ROCHESTER, NEW YORK, A CORPORATION OF NEW YORK.

CHECK-WRITER.

1,389,214.          Specification of Letters Patent.     Patented Aug. 30, 1921.

Application filed March 4, 1919. Serial No. 280,591.

*To all whom it may concern:*

Be it known that I, WALTER B. PAYNE, a citizen of the United States of America, and a resident of the city of Rochester, in the county of Monroe and State of New York, have invented certain new and useful Improvements in Check-Writers; and I hereby declare the following to be a full, clear, and exact description of the same.

This invention relates to printing machines, and particularly to machines adapted for printing words or other characters designating monetary amounts on checks or other commercial papers, and it has for its especial object to provide a machine by which all of the words or characters in such an amount can be printed simultaneously and repeated as often as desired.

A further object is to provide a machine in which a plurality of type carriers, each having a series of words or other characters thereon, are arranged side by side, each type carrier being capable of movement to bring any desired character to a position in which it can coöperate with a suitable platen, and in which the movement of the separate carriers is under the control of a single setting member.

A still further object is to provide means whereby all of the type carriers may be shifted simultaneously and released successively as each is brought to the desired position.

Another object is to provide means whereby any one type carrier can be readjusted prior to making an impression in case it happened to be erroneously set.

Still another object is to provide indicators movable in unison with the type carriers and arranged side by side without spaces between them so that the words appear in a line on the indicators exactly as they will appear when printed upon a check.

To these and other ends the invention consists in certain improvements and combinations of parts all as will be described more fully hereinafter, the novel features being pointed out in the appended claims.

In the drawings.

Similar reference numerals in the several figures indicate similar parts.

In the present embodiment of my invention there are employed a plurality of similar cylindrical type carriers 1, mounted loosely in contiguity on a shaft 2 carried by a frame consisting of a pair of arms 3 pivoted upon an operating shaft 4 journaled in bearings in upwardly extending portions 5 on a base casting 6, the shaft 4 being provided at one end with an operating lever 4ª by which it may be actuated. The several type wheels carry on their peripheries a series of type rows 7 arranged longitudinally parallel with the shaft 2 and are all movable to bring any desired word on each to a printing position in which they may coöperate with a stationary platen 8 to print upon a paper inserted between them and the platen, a series of words expressing a monetary amount, the platen being adjustable toward the type wheels to regulate the intensity of the printing impression by set screws 9, and locked in adjusted position by draw screws 10. The type wheels are moved toward the platen by means of toggle couples at each end of the machine, consisting of links 11 pivoted on a stud 12 carried by supporting plates 13 attached to the uprights 5 on the base, and at 14 pivoted to links 15, which are connected at 16 to the arms 3 supporting the type wheels. The links 11 are slotted radially at 17 to receive pins 18 on arms 19 rigidly connected to the shaft 4, an enlargement 20 of the slot allowing an idle motion of the operating shaft before the links are actuated, the purpose of this idle movement being to apply ink to the type wheels before the downward movement of the type wheels begins. The inking is accomplished in the following manner: The inking roll 21 is carried at its ends by arms 22 pivoted to the outer ends of swinging arms 24 pivoted at 25 to forward extensions on the end plates 13, and the arms 24 have pivoted thereto at 23, links 26 which, at their other ends, are pivoted at 27 to arms 28 swinging about the studs 12. These arms 28 carry rollers 29 which are engaged at the beginning of the movement of the operating lever by cam portions on the arms 19. These cam portions have a steep incline 30 at their beginning for the purpose of moving the inking roller 21 quickly across the type row which is in printing position, during the idle motion of the operating member, and a more gradual rise 31 sufficient merely to move the roller rapidly enough to keep it out of contact with the type wheels as they are moved down toward the platen by reason of engagement of the pins 18 with the links 11.

Figure 4:
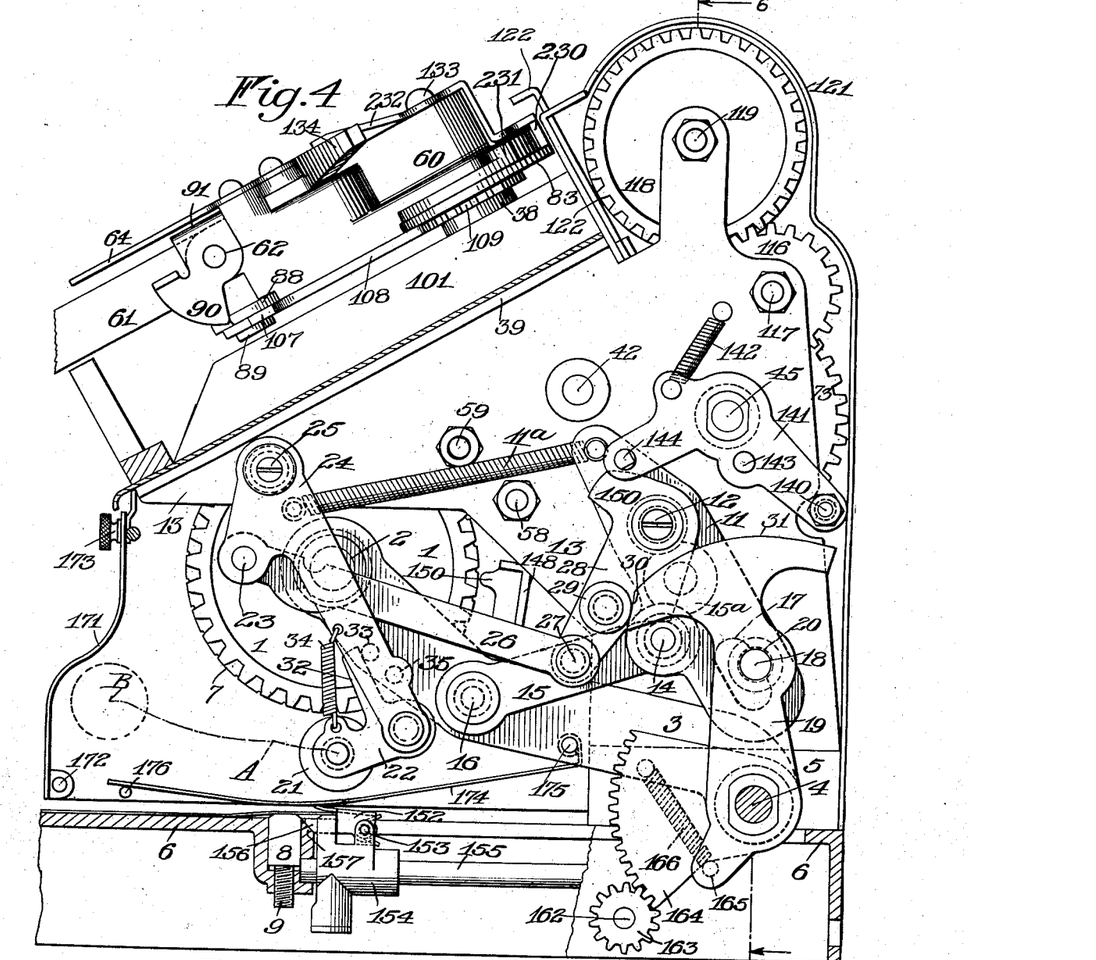
Fig. 4 is a vertical sectional view thereof just inside the right end wall of the casing.
Figure 7:
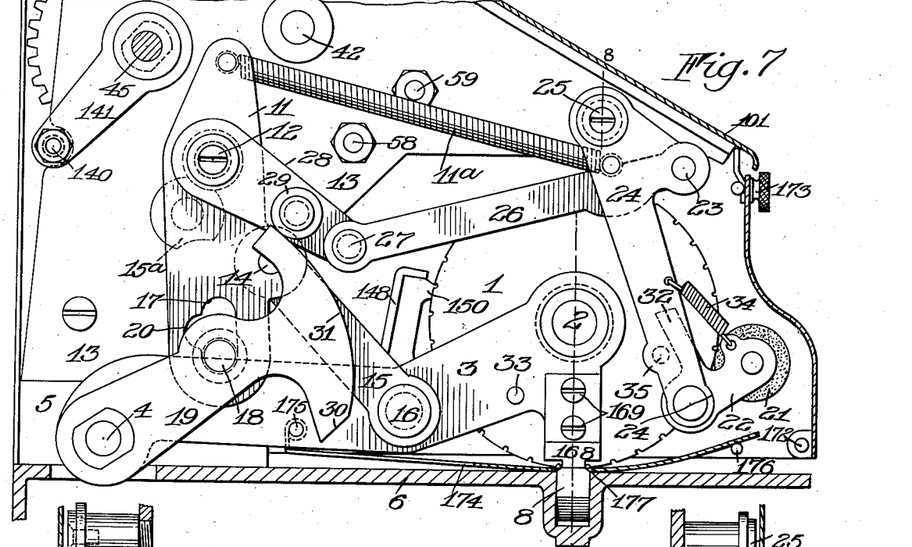
Fig. 7 is a view of a portion of the left hand end of the mechanism.

With the parts in the normal position as shown in Fig. 4, the inking roller is held out of contact with the type wheels to allow free rotation of the latter by means of upward extensions 32 on the arms 22, which are held against stop pins 33 on the arms 3 by means of springs 34. As soon as the arms 24 begin movement the arms 22 are rocked about their pivot by the springs allowing the roller to move into contact with the type wheels. The roller moves across the face of the type until the center thereof reaches the position indicated by A on the broken line in Fig. 4 when the arm 22 has rocked a sufficient distance for the extension 32 to engage stop pins 35 on the arms 24. The rollers then move as indicated by the dotted line until they are in the position B when the type wheel comes in contact with the platen as shown in Fig. 7. The arms 24 and the toggle links 11 are connected by springs 11ª, moving the latter until the ends of the links 15 come in contact with a stop 15ª, that also serves as a bearing for the shaft 48, to be later described, while said spring also maintains roller 29 in contact with cam 30.

Figure 8:
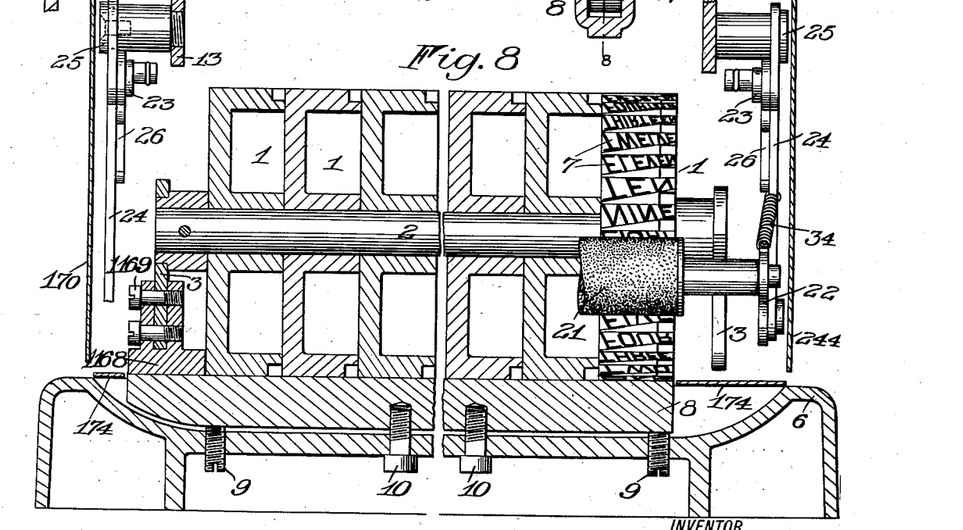
Fig. 8 is a vertical longitudinal sectional view through the type wheels on the line 8—8 of Fig. 7.
Figure 9:
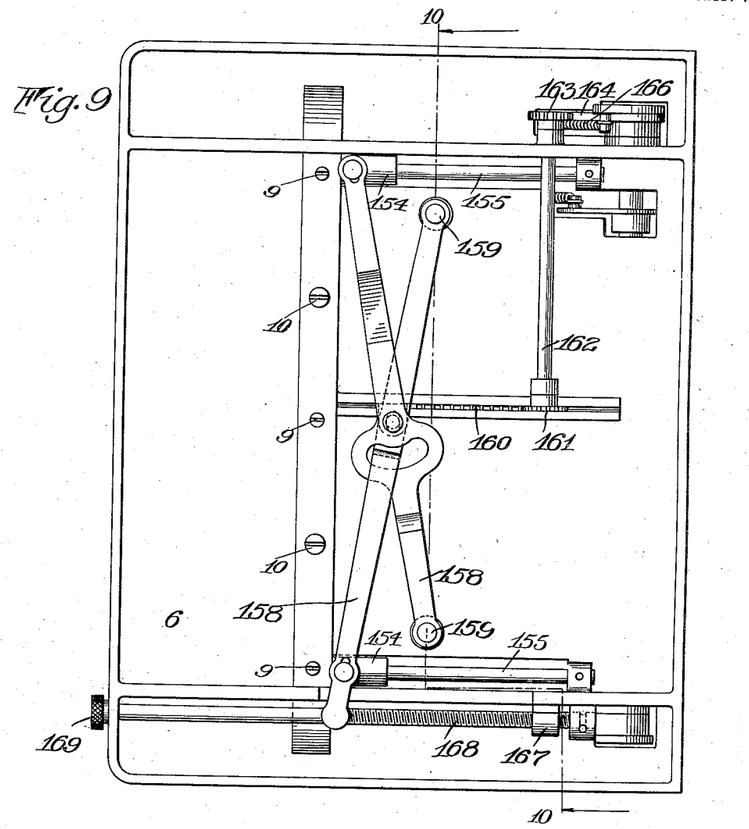
Fig. 9 is a bottom plan view of the assembled machine.
Figure 10:
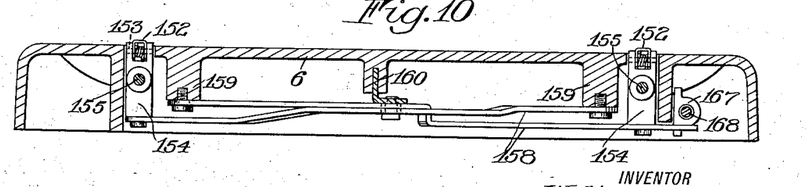
Fig. 10 is a vertical sectional view on the line 10—10 of Fig. 9.
Figure 11:
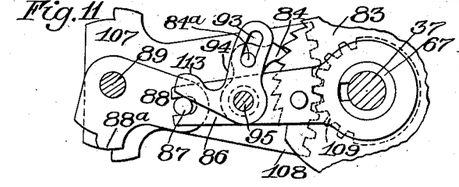
Fig. 11 is a detail sectional view on the line 11 of Fig. 5 showing the ratchet mechanism for advancing the disengaging cams.

The type rows preferably extend the full width of the wheel faces, and are formed as shown in Fig. 8 with the first letter of each row about twice the height of the last letter. The advantage of this arrangement is that it is possible to print the words in a line without space between them so there is no chance to add a letter or more to any word, and yet on account of the difference in height of the letters, the amount is readily legible. There are thus provided between the end letters of the type rows, spaces 36 which are adapted to receive the teeth of gears which are utilized for shifting the type wheels to any desired positions.

Figure 15:
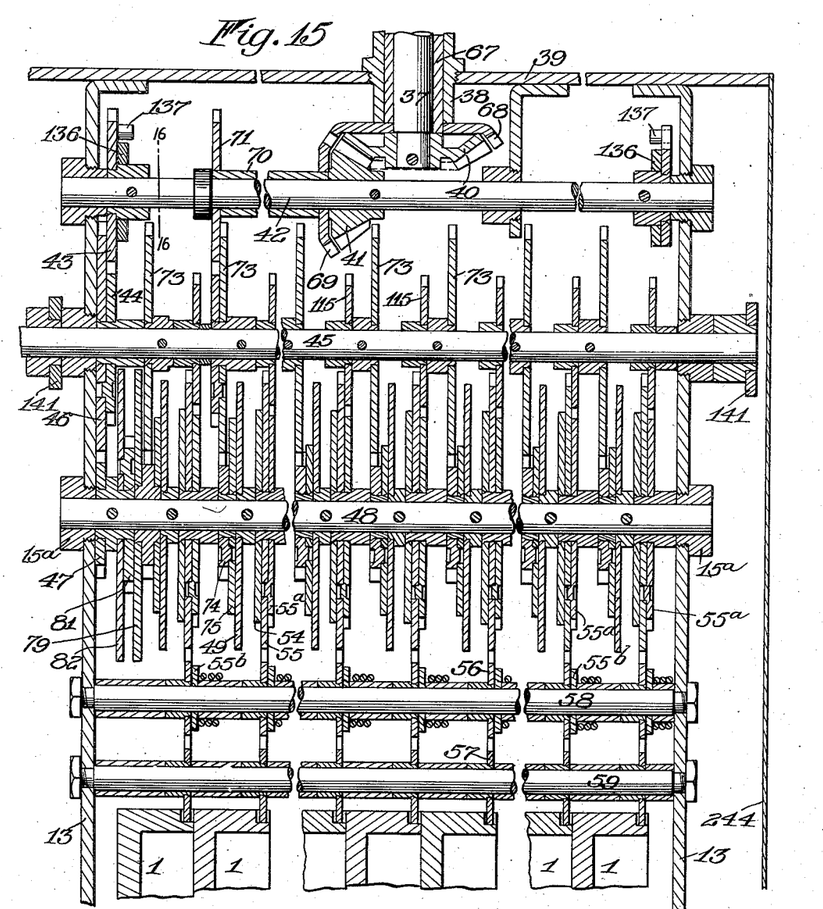
Fig. 15 is a diagrammatic sectional view showing the driving gear trains for the type wheels.

In the present invention one of the objects is to shift all of the type wheels by means of a single setting member, and, to this end, there is provided a setting shaft 37 (Fig. 5) rotatable within a sleeve 38, carried by a cross plate 39 connecting the end plates 13. This setting shaft carries at its lower end a bevel gear 40 (Fig 15) meshing with a gear 41 on a cross shaft 42; and the latter shaft has fixed thereto at one end a gear 43 which drives an idler gear 44 loose on the shaft 45. The idler 44 is rigidly connected with a larger gear 46 meshing with a small gear 47 on a shaft 48. The shaft 48 has fixed thereon a plurality of disks 49 one for each type wheel, each disk carrying a driving connection in the form of a spring actuated dog 50 (Figs. 17 to 23) pivoted thereto at 51 and having a laterally extending portion 52 adapted to engage within a notch 53 in the periphery of a disk 54 carried by a gear 55 loosely mounted on the shaft. Each gear 55 drives a type wheel by means of idlers 56 and 57 running loosely on the shafts 58 and 59. From the description so far it will be seen that with all the dogs 50 in driving connection with the disks 54, the rotation of the shaft 37 will shift all the type wheels simultaneously.

In order to readily determine the amount of rotation of the shaft 37 necessary to bring any desired word on the type wheels to printing position, an arm 60 is fixed to the upper end of said shaft, and a setting member or lever 61 pivoted thereto at 62 is provided with a knob 63 at its outer end whereby the arm 60 may be readily shifted to bring a pointer 64 thereon opposite any one of a series of indications 65 arranged on an arcuate segment 66 secured to the cross plate 39, the indications being identical with the words on the type wheels. In addition to the characters representing the words there are two extra indications entitled "Set-Up" and "Repeat" respectively arranged at the left and right ends of the segment. When the setting shaft is moved to bring the pointer opposite either of these indications a blank space on a connected type wheel will be brought opposite the printing position for a purpose that will presently appear.

In setting up an amount, the type wheels are all connected to be moved simultaneously by the setting member until the character opposite the pointer indicates the first number of the amount. The first type wheel is then disconnected from the driving mechanism and the remaining wheels are set up in the same manner. In case the words required are less in number than the total number of type wheels, the remaining type wheels are turned to the blank space and then disconnected. The mechanism for disconnecting the type wheels will now be described.

The shaft 37 is surrounded by and rotates within a sleeve 67 carrying at its lower end a bevel gear 68 meshing with a gear 69 on a sleeve 70 surrounding the shaft 42. A gear 71 on the latter sleeve drives a gear 72 fixed on the shaft 45, and the latter shaft has fixed thereon a plurality of gears 73 driving a series of pinions 74 which are loosely mounted on the shaft 48, each pinion being secured to a cam 75, one of which is adjacent each driving disk 49. These cams are provided with cut away portions 76 of varying length in their peripheries, the cam for the first type wheel having the shortest cut while that for the tenth or right hand wheel has the longest. Each of the cams is adapted to engage a pin 77 on the corresponding dog 50 and raise the pin 52 out of engagement with the notch 53 of the disk 54.

Figures 17, 18, 19, 20, 21, 22, 23:
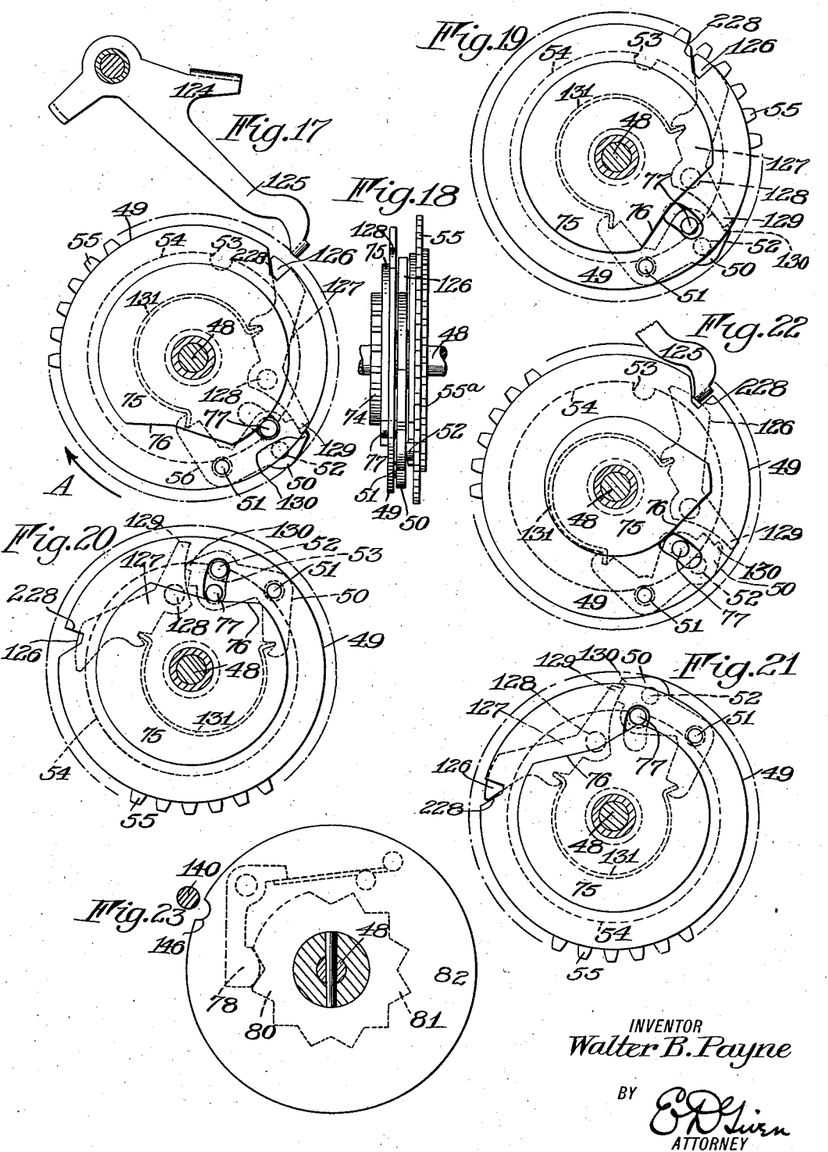
Fig. 17 is a vertical sectional view on the line 17—17 of Fig. 6 looking in the direction of the arrow, showing the position of the first type wheel driving connection when set to repeat position.
Fig. 18 is a side elevation thereof.
Fig. 19 is a view similar to Fig. 17 showing the parts in set up position.
Fig. 20 is a similar view showing the position the parts occupy when the first type wheel is moved to bring the word "nine" to printing position.
Fig. 21 is a similar view showing the position of the parts when the releasing cam is advanced one step to disengage the driving device.
Fig. 22 is a view of the driving connection for the tenth type wheel showing the manner in which the tripping device is actuated.
Fig. 23 is a detail sectional view on the line 23—23 of Fig. 6 showing the manner which the safety lock for the operating member is prevented from moving except when the setting member is in a certain position.

When the cams are turned to the position shown in Figs. 19 and 22, the notches are all in alinement and all of the dogs may drop into the notches in the corresponding disks 54, when the setting shaft is turned to bring them opposite the latter. As will be clearer later, the setting shaft is turned step by step, a step each time a type wheel is disconnected from the setting mechanism. If the cams are finally turned to the position shown in Fig. 17, all the dogs will have been raised out of the notches in the disks and the type wheels will all be free from control by the setting member. The cams normally move in unison with the shaft 48 and are prevented from accidental motion relative thereto by means of a spring pressed pawl 78 (Fig. 23) carried by a disk 79 fixed to one of the gears 74, and having a centering portion engaging between the teeth of a wheel 81, which, together with a disk 82, are fixed on the hub of the gear 47 on the shaft 48.

In order to bring the shifting of the cams on the shaft 48 under the control of the setting member a ratchet wheel 83 is fixed to the upper end of the sleeve 67, and this ratchet wheel is rotated by a pawl 84 pivoted at 85 to an arm 86 which swings loosely on the upper end of the sleeve 67, and is moved in one direction by a spring 84$^b$. The arm 86 is slotted at its outer end to receive a pin 87 on a bell crank lever 88 pivoted on a stud 89 beneath the outer end of the arm 60 and having an arm 88$^a$ which is engaged by a depending portion 90 of a yoke 91 which is rigidly connected at 92 to the setting lever 61. The pawl 84 is provided with a pin 84$^a$ which enters a slot 93 in a lever 94 pivoted at 95 to the under side of the arm 60 and is yieldingly engaged with the teeth of the ratchet by a spring 96, which rotates the lever 94 about its pivot. In order to hold the type wheels stationary while being disconnected, the lever 61 is prevented from lateral motion while being depressed by means of a series of upstanding pickets mounted on the top of the frame with their upper ends just below the bottom of the lever so that the latter clears them as it is swung laterally. Spring actuated centering dogs 55$^b$ (Fig. 5) loosely mounted on the shaft 58 engage between the teeth of the gears 55 and prevent accidental motion of the type wheels after they are disconnected. From the above description it will be understood that when it is desired to set a certain word on a type wheel in printing position the lever 61 is shifted with reference to the segment 66 until the pointer 64 is opposite the desired word. Depression of the lever then rocks the lever 88 which in turn actuates the pawl carrying arm 86, rotating the sleeve 67 one division or step and simultaneously advancing the cams 75 through the intermediate gearing. The notch in the first cam is sufficiently short so that this movement raises pin 52 on the dog 50 out of the notch 53 in the adjacent disk, thereby disconnecting the first type wheel. The setting lever is then moved to a new position and depressed, the second cam then disconnecting the second type wheel, and so on.

If the number of words in the amount set up is less in number than the total number of type wheels, it is necessary to revolve the remaining wheels to the blank position before disconnecting them. In the present construction there are provided means actuated by a single movement of the setting lever whereby any number of type wheels may be disconnected when the setting lever has been moved to a certain position, the connected type wheels then occupying the blank position. To accomplish this object the setting lever is moved so that the pointer is opposite the word "Repeat" (Fig. 3), in which position a laterally extending lug 97 on the depending arm 90 engages a lever 98 carried on a shaft 102 journaled in a bearing 99 within an upstanding post 100 supported by the top 101 of the casing of the mechanism.

Figures 3, 12, 13, 14:
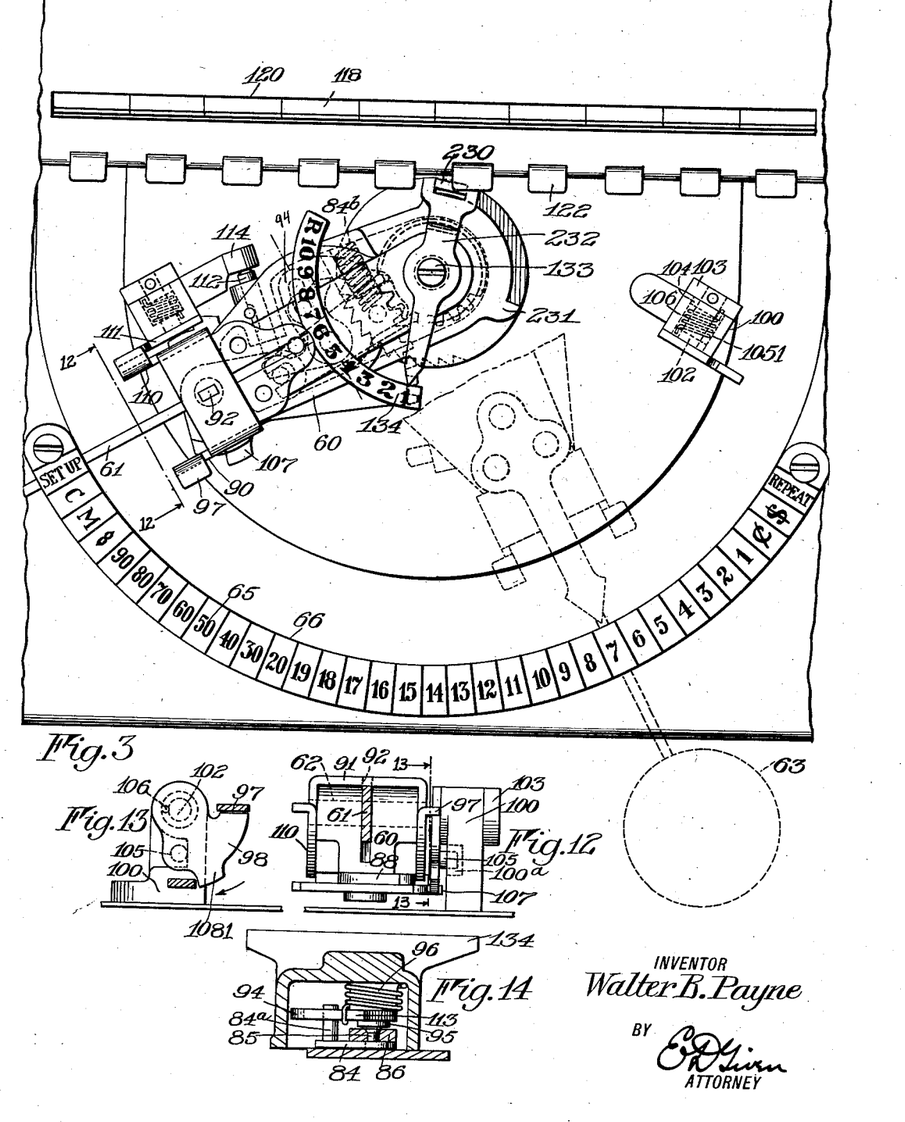
Fig. 3 is a top plan view of a portion thereof.
Fig. 12 is a view on the line 12—12 of Fig. 3 showing the setting lever moved to the extreme right position.
Fig. 13 is a similar view on the line 13—13 of Fig. 12 looking in the direction of the arrow.
Fig. 14 is a similar view on the line 14—14 of Fig. 5 looking in the direction of the arrow.

The shaft 102 has secured to its other end a collar 103 having a reduced portion 104 bearing within a recess 105¹ of the post 100 and a spring 106 surrounds the shaft and is attached at its opposite ends to the collar and post, respectively, the spring tending to rotate the lever 98 in the direction of the arrow in Fig. 13, the motion of the lever being limited by a stop pin 105 thereon engaging a lug 100ª on the post. With the setting lever in "Repeat" position, a lever pivoted on the stud 89 below the lever 88 projects into the path of an extension 108¹ on the lever 98, the latter lever serving to transfer motion from the setting lever to the lever 107, which carries a gear segment 108 meshing with a pinion 109 secured to the sleeve 67. The velocity ratio of the gear combination 108, 109 is ten times that of the ratchet mechanism, so that one complete depression of the setting lever is sufficient to shift the cams far enough to disconnect all the type wheels. If part of the wheels have been disconnected by operation of the ratchet mechanism, the remaining wheels are disconnected by the gear train, the ratchet wheel 83, of course, advancing in the same direction as and at a more rapid rate than the pawl.

In the same manner, the cams are all moved to a position to allow the type wheels to be connected to the setting member by moving the latter around the segment to the extreme left hand position in which the pointer is opposite the words "Set-Up". When the lever is depressed in this position a depending arm 110 thereon, engages with a lever 111 similar to the lever 98 by which its motion is transferred to the lever 107 carrying the gear segment 108 and revolving the sleeve 67 in a counter clockwise direction as shown in Fig. 3. To allow this backward motion of the sleeve the pawl 84 is lifted out of engagement with the ratchet wheel by rocking the lever 94 to the position shown in Fig. 3, this being accomplished by a sliding pin 112 bearing at one end against a crank arm 113 on the lever 94 and at the other engaging a stationary stop 114 on the top of the casing.

Figure 1:
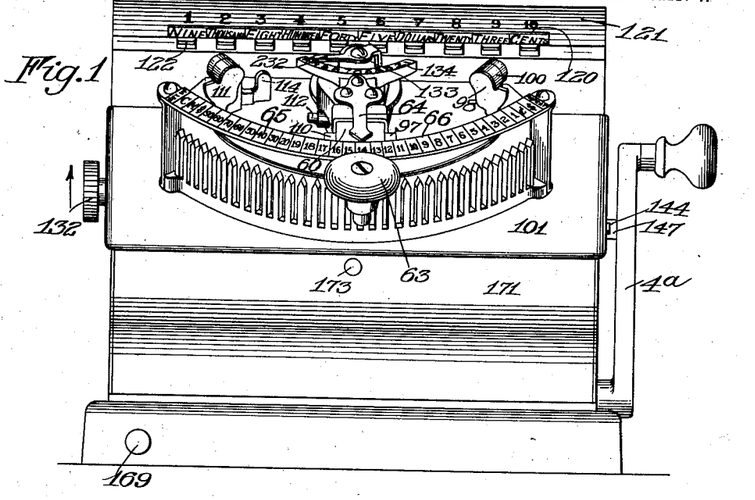
Figure 1 is a front elevation of a machine constructed in accordance with my invention.
Figure 24:
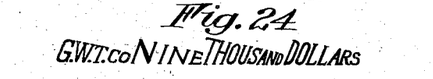
Fig. 24 is a view showing the appearance of a complete printed line.

It is desirable that before making an impression from the set up type wheels, there be provided some visible means of ascertaining whether the amount has been correctly set up. This is accomplished in the following manner: Connected to each gear wheel 55 is a smaller gear 55ª meshing with an idler 115 on the shaft 45, which in turn transmits its motion through an idler 116 on the cross shaft 117, to an indicating wheel 118 having on its periphery a series of characters identical with those on each type wheel. The wheels 118 are arranged in contiguity on a shaft 119 in the same manner as the type wheels, with the word rows extending the full width of the faces, and the small letters at the ends of the words occupying the ends of the driving teeth. The words are visible through a slot 120 in a plate 121, extending over the wheels and forming the rear wall of the casing. When an amount has been set up on the type wheels, the words appear in a line on the indicator wheels exactly as they will appear on the printed check, as shown in Fig. 24. Consecutive numbers are arranged on the casing over the slot 120, and adjacent the indicator wheels, beginning at the extreme left as shown in Fig. 1, for a purpose that will presently appear.

Figure 5:
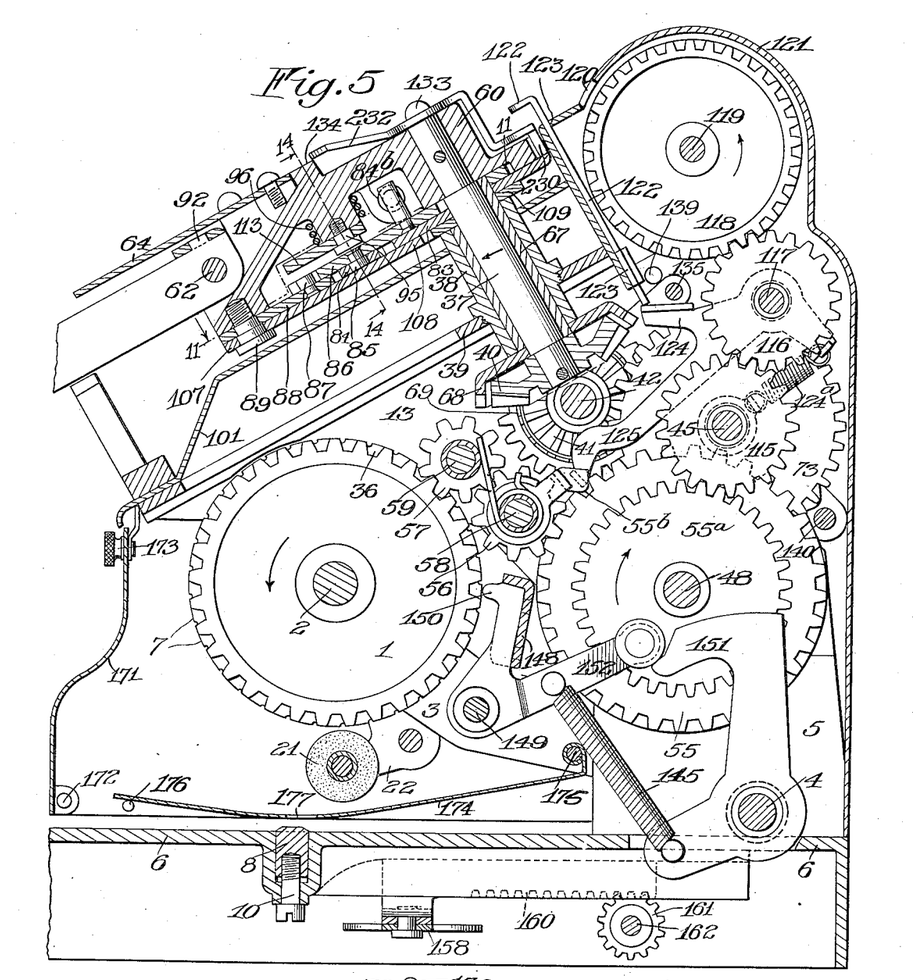
Fig. 5 is a central vertical sectional view.
Figure 6:
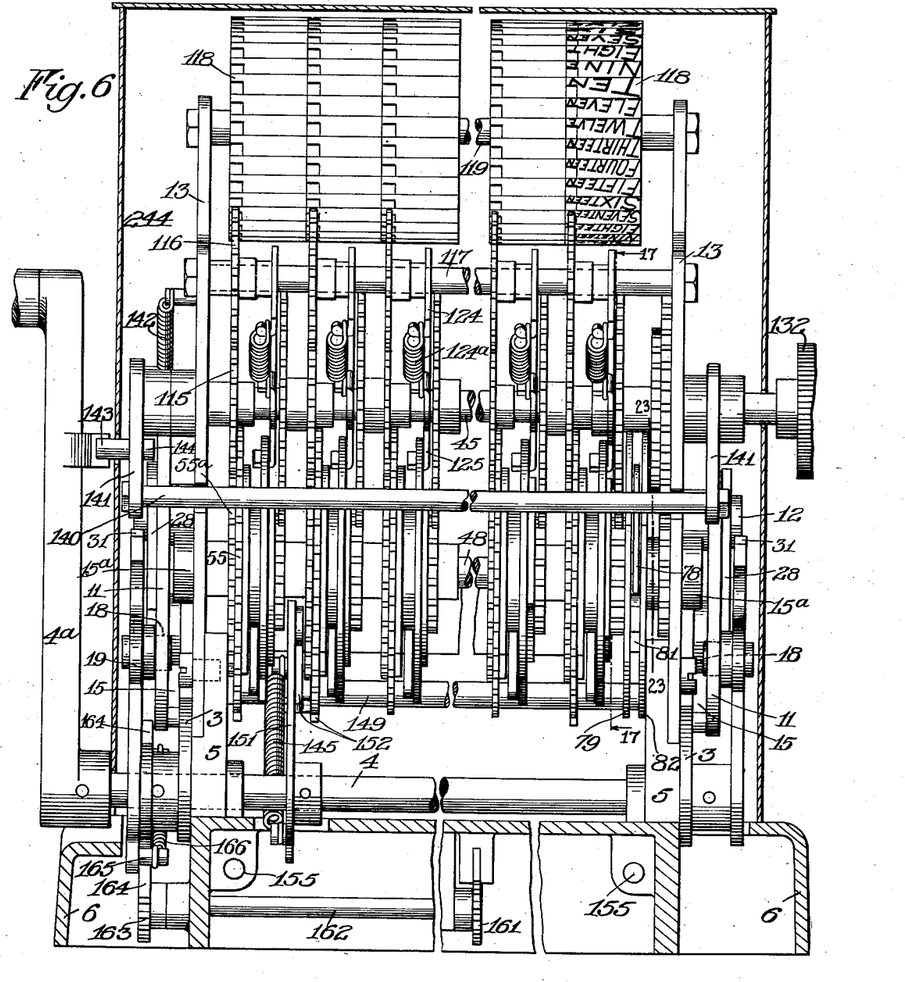
Fig. 6 is a vertical sectional view on the line 6—6 of Fig. 4 looking in the direction of the arrows.

In order to allow mistakes made in setting one or more type wheels to be rectified without the necessity of restoring all of the type wheels to blank position and resetting them all anew, a number of individual resetting keys are provided, one for each type wheel, depression of any one of which enables the corresponding type wheel to be shifted to the desired position. Referring to Fig. 5, a plurality of sliding keys 122 are mounted in guides 123 to move vertically in front of the corresponding indicator wheels. The lower end of each key engages a lever 124 loosely mounted on the shaft 117, and arms 125 on the levers (Fig. 17) are adapted to coöperate with arms 126 of retaining dogs 127 pivoted at 128 on the disks 49, the levers 124 being normally retracted to the position shown in Fig. 5 by springs 124ª. These dogs 127 have shoulders 129 at their ends which engage beneath shoulders 130 on the driving dogs when the latter have been raised by the cams, and serve to prevent the return of the driving dogs when the cams are once more moved out of coöperative relation with the latter. Each retaining dog and coöperating driving dog are both actuated by the same spring 131.

Assuming that the type wheels have been set up to represent an amount, the first word of which is Nine, the parts would appear as shown in Fig. 17, the driving dog occupying the position shown when the setting lever is in "repeat" position. Now if it is desired to change the setting of the first type wheel, the cams are all turned in the direction of the arrow A in said figure by means of a knob 132 (Fig. 1) on the left hand end of the shaft 45, which is permanently geared to the cams, bringing the parts to the position shown in Fig. 19. The relative motion of shaft 48 and the cams movable thereon is limited by an upwardly extending stop 230 on the ratchet wheel 83, coming in contact with shoulders 231 on the setting arm 60. After the cams are shifted, the resetting key is depressed, releasing the driving dog 50 as shown in Fig. 22. (This figure shows the cam for the tenth wheel but the dogs are released in exactly the same manner for all wheels). In order to insure that the arm 126 of retaining dog 127 is always opposite the release lever 125, the end of the latter is offset at right angles to bear on the edge of the disk 49, and it can only be depressed when the setting lever is at "repeat" or "set up" position, that is, when a notch 228 in the edge of the disk registers with the offset end and allows the depression of the tripping lever. The setting lever is then moved to bring the pointer to the position 9 when the driving dog drops into the notch 53 in the driven disk 54 and once more establishes driving connection with the type wheel. The setting member is then moved to the proper position and the knob 132 turned to a stop in the opposite direction when the cams once more disconnect the type wheel.

In case one or more of the type wheels near the right end of the machine are to be reset, it is merely necessary to revolve the cams far enough to be out of coöperative relation with the driving dog when the latter is tripped. This may be ascertained by providing a pointer 232, pivoted at 133 to the shaft 37 and connected to the stop portion 230, whereby rotation of the knob 132 while the setting lever is held in repeat position causes the pointer to traverse a segment 134, on which appear as many numerals as there are type wheels and the letter R standing for repeat. When the pointer is opposite a certain number it indicates that the cams individual to the type wheel of corresponding number and all wheels to the right thereof have been moved to inoperative position. When the pointer stands at the letter R all of the cams have once more operated to release the driving means for all the type wheels.

Figure 16:
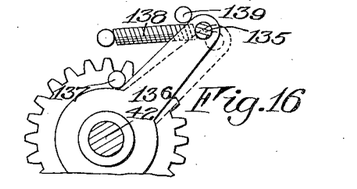
Fig. 16 is a detail sectional view on the line 16—16 of Fig. 15 showing the mechanism for actuating the universal bar.

When it is desired to restore all the type wheels to blank position prior to setting them to print another amount, the setting lever is turned to the "set up" position, and depressed, the driving connections appearing as in Fig. 22. In order to obviate the necessity of depressing each resetting key independently a universal bar 135 is carried loosely on the shaft 42 by arms 136, and extends across the machine above the tripping levers 124. This bar is depressed only when the setting lever is in "set up" position, by means of stop pins 137 carried by disks fixed on the shaft, engaging with the arms 136. In Fig. 16 the position of the parts described is when the setting lever stands at the character C representing the word "Thousand." Movement of the setting lever to "set up" position results in the rotation of the arms 136 to the position shown in dotted lines, depressing the tripping levers. The arms 136 are returned by a spring 138 into contact with a stationary stop 139 on the frame. After the driving dogs are tripped, the setting lever is moved all the way around the segment, thereby allowing the dogs to drop into the notches 53 in the disks 54, no matter what their angular position and then the setting takes place as before described.

Figure 2:
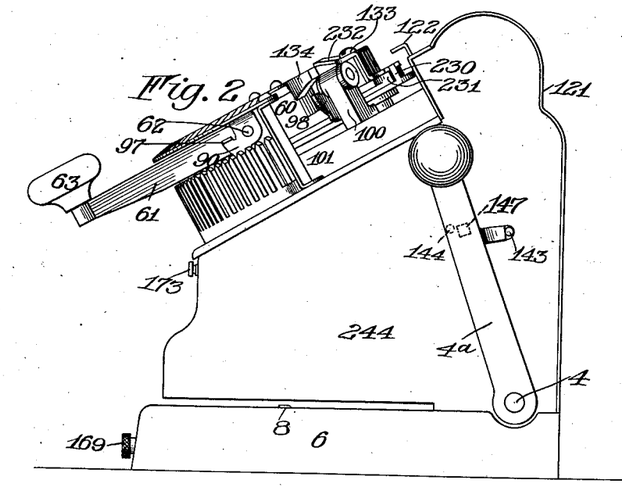
Fig. 2 is a right end elevation thereof.

When all the type wheels are set up, the operating lever 4$^a$ may be depressed to bring them into contact with the platen. To prevent operation of the lever when the type wheels are not in alinement or when they have not all been disconnected a locking bar 140 carried by arms 141 is pivotally mounted on the shaft 45, and is actuated toward the gears 55 by means of a spring 142. The right hand arm 141 is provided with two pins 143 and 144 which extend through the end cover plate 244 and engage with the operating lever, as shown in Fig. 2. The operating lever is normally held in engagement with the pin 143 to hold the bar 140 out of coöperative engagement with the gears 55 by means of a spring 145 which is strong enough to overcome the resistance of the light spring 142. The disks 79 and 82 (Fig. 23) are provided with peripheral notches 146 which are in alinement opposite the locking bar 40 when the setting member is depressed in "repeat" position. Consequently when the operating lever is moved forwardly, the arm 141 follows it and the bar 140 drops into the space between adjacent teeth of the gears 55, thereby preventing any accidental movement of the latter. If one or more of the type wheels should have been incorrectly centered or if any one of the type wheels should have inadvertently been left connected to the setting member, the inward motion of the bar 140 would be prevented so that the pin 144 would remain in the path of a lug 147 on the operating member, and thereby prevent a complete actuation of the latter to make an incorrect imprint on the check. If, however, the pin 144 is clear of the lug 147, continued downward motion of the lever causes a cam 150, on the arm 28, to engage under the pin 144 and thereby lock the bar 140 in engagement with the gears.

In addition to locking the gears 55, it is also necessary to lock the type wheels themselves against rotation as the latter are moved out of engagement with the pinions 57 when an impression is made, and this is accomplished by a locking bar 148 pivoted on a cross rod 149 carried by the frame 3, and having projections 150 entering the tooth spaces on the type wheels. This locking bar is actuated prior to the beginning of the downward motion of the type wheels, by means of a cam 151 on the operating shaft which coöperates with a lever 152 connected to the locking bar, said lever being moved into contact with the cam 151 by means of the same spring 145 which returns the operating shaft.

On account of the length of the machine being greater than the length of some checks which may be printed therein, means are provided whereby a check may be inserted part way from the front of the machine and grasped by grippers which draw it back to the proper position before the impression takes place. These grippers of which two are employed, consist of spring actuated clamps 152 pivoted at 153 on slides 154, guided on bars 155 in the base, and the clamps 152 have forward extensions 156 coöperating with cam portions 157 on the base to raise the clamps when in their extreme forward position so that the check can be freely inserted. The slides are simultaneously retracted by lever arms 158 pivoted at 159 to the base, the arms intersecting at approximately their middle points where they are connected to a rack bar 160 driven by a pinion 161 on a rock shaft 162 at the other end of which is another pinion 163, meshing with a gear 164 loose on the operating shaft. The gear 164 is normally held against a stop 165 on the shaft by a spring 166, by means of which it is rotated until one of the levers 158 engages an adjustable member 167 movable on a screw 168 which is journaled in the base, and provided with a knob 169 at its front end. By rotating the screw the member 167 can be moved forward or back to determine the position at which the grippers stop. Continued motion of the operating member is permitted by the spring 166.

In the present construction there is provided a stationary type character which is located at the left end of the machine next the first type wheel. This character may be of any form, containing if desired, the name or initials of the person or organization which draws the checks to be printed on the machine, as shown in Fig. 24. This type character is mounted on a block 1168 having a forked portion on its upper side, which is slipped over a portion of the link 3 at the left end of the machine and secured thereto by screws 1169. To change this character it is merely necessary to remove the left end wall 170 of the casing, when the screws may be readily removed and the type character dropped down clear of the supporting link.

Access to the ink roll for the purpose of reinking or cleaning is provided for by hinging the front wall 171 of the casing at its lower edge at 172, the wall being secured by means of a thumb latch 173. To prevent accidental contact of the check to be printed with either the ink roll or the type rows to either side of the one located in printing position, a shield 174 is pivoted at 175 to the frame 3 and rests at its other end on pins 176 carried by the end walls 170, 244. When the type wheels are depressed a slot 177 in the plate 174 is alined opposite the platen and allows the paper to be impressed thereby against the type wheels.

The operation of the machine is as follows: A check to be printed is inserted beneath the type wheels with its rear edge in contact with the grippers 152. The knob 63 is next grasped and the lever 60 moved to the extreme left or "set up" position and depressed, the lateral motion of the lever 60 causing the operation of the universal bar 135 and the consequent tripping of all of the dogs 50 which were held up by their retaining dogs 129, and the depression of the lever 61 rotating the cams 75 to a position in which the dogs 50 are permitted to coöperate with the disks 54. The rotation of the cams 75 could be produced directly by rotating the knob 132 in the direction of the arrow (Fig. 1) until it comes to a stop.

The lever 60 is now moved across the segment and during this motion, the pins 52 on the dogs 50 will come opposite the notches 53 in the driving disks 54, no matter what the positions of the latter happen to be. The type wheels are now all connected to the setting lever which is moved to the position on the segment in which the pointer 64 indicates the first word of the amount to be set up. The knob 63 is then depressed and the extreme left or No. 1 type wheel will then be disconnected. The lever 60 is then moved to the position indicating the second word of the amount, and the knob 63 depressed as before, this operation being repeated until all of the words are set up.

The lever 60 is then moved to the right to "repeat" position and depressed, thereby disconnecting any of the type wheels which were not utilized. The amount which has been set up, now appears through the slot 120 in the casing and if upon inspection, it is found that any error has been made it can be corrected as follows: The knob 132 is rotated in the direction of the arrow (Fig. 1) until the pointer 232 indicates the number of the segment 134 corresponding to the number of the type wheel which has been erroneously set. The release key 122 in front of the corresponding indicator wheel is now depressed and the lever 60 moved to bring the pointer 64 opposite the character 14 corresponding to the one appearing on the indicator wheel. The lever 60 is then moved to indicate the correct character and turn the type carrier and indicator to print and show the right word and the knob 132 rotated in a direction opposite that indicated by the arrow (Fig. 1) until it comes to a stop, once more disconnecting the re-adjusted type wheel and all of the wheels which are not to print.

The operating lever 4ª is now depressed, the first part of the motion drawing the check back under the type wheels into proper printing position and the continued motion of the lever causing the downward movement of the type wheels into contact with the platen. Any number of impressions may be made with a certain "set up" of the type wheels as the latter are inked at each operation of the impression lever.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is:

1. In a printing machine, the combination with a plurality of type wheels and a setting member therefor, of spring actuated means for operatively connecting each of the type wheels with the setting member, means movable with the setting member for coöperating with the spring actuated means to successively disconnect the setting member and type wheels, the setting member having a motion in one direction to shift the type wheels and in another direction to actuate the disconnecting means.

2. In a printing machine, the combination with a plurality of type wheels and a setting member therefor, of spring actuated means driven by the setting member for operatively connecting each of the type wheels thereto, a plurality of cams movable with the setting member, and adapted to coöperate with the spring actuated means to successively disconnect the setting member and type wheels, the setting member having a motion in one direction to shift the type wheels, during which motion the cams remain in fixed relative position thereto, and the setting member having another motion during which the cams are moved relatively thereto to successively disengage the spring actuated means.

3. In a printing machine, the combination with a plurality of type carriers and a setting member therefor, of means for operatively connecting the setting member with each of the type carriers, means for disconnecting the type carriers successively from the setting member, the type carriers being shifted by one motion of the setting member, and means actuated by another motion of the setting member when in one position, for rendering inoperative the disconnecting means.

4. In a printing machine, the combination with a plurality of type carriers and a setting member therefor, of driving means for operatively connecting the setting member with each of the type carriers so that all of the latter may be shifted by one motion of the former, means actuated by another motion of the setting member for disconnecting the type carriers one at a time therefrom, and means actuated by a motion of the setting member when in one position for disconnecting all the type carriers which have not been previously disconnected.

5. In a printing machine, the combination with a plurality of type wheels and a setting member therefor, of driving means connecting each of the type wheels with the setting member, a platen for coöperating with the type wheels, an operating member for causing relative motion of the type wheels and platen, and a locking device for the operating member for preventing the operation of the latter when any one of the driving means is in operative connection.

6. In a printing machine, the combination with a plurality of type wheels and a setting member therefor, of driving means for connecting each of the type wheels with the setting member, a platen, an operating member for causing the coöperation of type wheels and platen, and a spring actuated locking device for the operating member, movable out of the path of the latter when all of the driving means are disconnected.

7. In a printing machine, the combination with a plurality of type wheels and a setting member therefor, of driving connections between the latter and each of the type wheels, releasing mechanism movable with the setting member having a step by step relative motion thereto for the purpose of successively interrupting the driving connections, a platen, an operating member for causing coöperation of the type wheels and platen, and a spring actuated locking device for the operating member, movable out of the path of the latter when the releasing mechanism has been moved to interrupt all of the driving connections.

8. In a printing machine, the combination with a plurality of type wheels and a rotary setting shaft and driving connections between it and the type wheels, of a setting member pivoted to the shaft having one movement whereby the shaft is rotated to shift the type wheels, and means actuated by rocking the setting member on its pivot to interrupt the driving connections between the setting shaft and type wheels.

9. In a printing machine, the combination with a plurality of type wheels and a rotary setting shaft, of spring actuated driving means for operatively connecting each of the type wheels with the setting shaft, a setting member pivoted to the setting shaft whereby the shaft may be rotated to shift the type, and means actuated by rocking the setting member on its pivot for disconnecting the driving means successively.

10. In a printing machine, the combination with a plurality of type wheels and driving gears therefor, of a rotary setting shaft, an intermediate shaft geared thereto, driving connections carried by the intermediate shaft and coöperating with the driving gears, a plurality of cams for disengaging the driving connections loosely mounted on the intermediate shaft, and rotatable therewith, a setting lever pivotally carried by the setting shaft whereby the latter may be rotated to shift the type wheels, and operative connections between the setting lever and cams whereby rocking the lever about its pivot adjusts the cams angularly on the intermediate shaft with a step by step motion for successively disengaging the driving connections for the type wheels.

11. In a printing machine, the combination with a plurality of type wheels and a setting member, of driving connections between the setting member and each of the type wheels, a plurality of progressively movable members for disconnecting the type wheels from the setting member, the type wheels being shifted by one movement of the setting member and the progressively movable members being actuated to disconnect a single type wheel by another movement of the setting member, and means actuated by the setting member when it is in one position, whereby a single movement thereof causes a movement of the progressively movable members to disconnect all the type wheels.

12. In a printing machine, the combination with a plurality of type wheels and a setting member, of driving connections between the setting member and each of the type wheels, a plurality of progressively movable members for disconnecting the type wheels from the setting member, the type wheels being shifted by one movement of the setting member and the progressively movable members being actuated to disconnect a single type wheel by another movement of the setting member, and means actuated by the setting member when it is in one position, whereby a single movement thereof causes a movement of the progressively movable members to restore all the driving connections for the type wheels to operative relationship.

13. In a printing machine, the combination with a plurality of type wheels and a rotary setting shaft, of a setting lever pivoted thereto, driving connections between the setting shaft and each of the type wheels, a plurality of progressively movable members for disconnecting the type wheels from the setting shaft, ratchet mechanism actuated by moving the setting lever about its pivot for moving the progressively movable members to disconnect a single type wheel, and a member actuated by the setting lever when the setting shaft is in one position, whereby a single movement of the lever causes a movement of the progressively movable members to disconnect all the type wheels.

14. In a printing machine, the combination with a plurality of type wheels, and a rotary setting shaft, of a setting lever pivoted thereto, driving connections between the setting shaft and each of the type wheels, a plurality of progressively movable members for rendering inoperative the driving connections, a ratchet mechanism actuated by moving the setting lever about its pivot for moving the progressively movable members in one direction to disconnect a single type wheel, means for preventing the operation of the ratchet mechanism when the setting shaft is moved to a certain position, and means actuated by the setting lever when the shaft is in this position, whereby a single movement of the lever causes a movement of the progressively movable members in the opposite direction from that in which the ratchet mechanism moves them to restore all of the driving connections to operative relationship.

15. In a printing machine, the combination with a plurality of type carriers, and a setting member therefor, of driving means for operatively connecting the type carriers with the setting member, controlling means for disengaging the driving means, retaining devices for preventing the reëngagement of the driving means, when the controlling means is moved out of coöperative relation with the latter, and manually operable tripping devices for selectively withdrawing the retaining devices, and permitting the reëngagement of the driving means for any particular type carrier.

16. In a printing machine, the combination with a plurality of type carriers and a setting member therefor, of driving means for operatively connecting the type carriers with the setting member, controlling means for selectively disengaging the driving means for any particular type wheel, retaining devices for preventing the reëngagement of the driving means when the controlling means is moved out of coöperative relation with the latter, manually operable tripping devices for selectively withdrawing the retaining devices, and indicating devices for determining the position of the controlling means.

17. In a printing machine, the combination with a plurality of type carriers, and a setting member therefor, of driving means for operatively connecting the type carriers with the setting member, controlling means for disengaging the driving means, retaining devices for preventing the reëngagement of the driving means, when the controlling means is moved out of coöperative relation with the latter, manually operable tripping devices for selectively withdrawing the retaining devices and permitting the reëngagement of the driving means for any particular type carrier, and a universal member actuated by a movement of the setting member when in one position for operating all of the tripping devices.

18. In a printing machine, the combination with a plurality of type wheels and a setting member therefor, of spring actuated members for operatively connecting each of the type wheels therewith, a plurality of cams movable with the setting member and adapted to coöperate with the spring actuated members for disconnecting the type wheels, retaining latches for preventing the reëngagement of the spring actuated members when the cams are moved out of coöperative relation with the latter, and manually operable tripping devices adapted to coöperate with the retaining latches when the setting member is in one position, whereby the spring actuated members may be selectively released to operatively connect any particular type wheel with the setting member when the latter is moved.

19. In a printing machine, the combination with a plurality of type wheels, and a setting member therefor, of spring actuated members for operatively connecting each of the type wheels therewith, a plurality of cams movable with the setting member and adapted to coöperate with the spring actuated members for disconnecting the type wheels, retaining latches for preventing the reëngagement of the spring actuated members, when the cams are moved out of coöperative relation with the latter, manually operable tripping devices adapted to coöperate with the retaining latches to selectively release the spring actuated members, and permit any one of them to shift the corresponding type wheel when the setting member is moved, and a universal member actuated by a movement of the setting member when in one position for withdrawing all of the tripping devices.

20. In a printing machine, the combination with a plurality of type wheels arranged in contiguity, having word lines thereon extending the full width of the face of each type wheel, of a plurality of indicator wheels also arranged in contiguity, each provided with word lines identical with those on the corresponding type wheel, and gearing between each indicator wheel and corresponding type wheel, including gears whose teeth enter the spaces between the word lines on both the type wheels and indicator wheels.

21. In a printing machine, the combination with a plurality of type wheels, each having word lines arranged longitudinally thereon and capable of being shifted to bring any word to a printing position, and a pivoted frame in which the type wheels are mounted, of a platen for coöperating with the type wheel, an operating member, impression mechanism actuated by the operating member for moving the type wheels into contact with the platen, an inking roller, and a pivoted frame for carrying the latter across the type line which is in printing position to apply ink thereto, and a cam carried by the operating member for moving the ink roller to apply ink to the type line before the operating member actuates the impression mechanism.

22. In a printing machine, the combination with a plurality of type wheels, an operating member carried on a shaft, a frame pivoted on said shaft and carrying the type wheels, of a platen coöperating with the type wheels, a toggle couple actuated by the operating member, an inking roller having a motion across the face of the type wheels to apply ink thereto, and a cam on the shaft for causing the inking movement before the operating member actuates the toggle couple to move the type wheels toward the platen.

23. In a printing machine, the combination with a plurality of type wheels each having word lines arranged longitudinally thereon, and capable of being shifted to bring any word to a printing position, an operating member carried by a shaft, a frame pivoted on said shaft and carrying the type wheels, a centering member on said frame adapted to lock the type wheels with the words in printing position in alinement, of a platen coöperating with the type wheels, a toggle couple actuated by the operating member and a cam on the shaft for moving the centering member to lock the type wheels before the operating member engages with the toggle couple to move the type wheels toward the platen.

24. In a printing machine, the combination with a printing couple and operating means therefor, of a pair of gripping members, guides on which the gripping members move to feed a check or other paper between the members of the couple, a pair of pivoted links crossing near their centers and connected at their ends to the gripping members, an adjustable stop member for limiting the motion of the grippers and an actuating member for the links engaging them at their intersection and yieldably connected to the operating member, so that the latter may continue its motion to cause an impression of the printing couple after the feeding motion of the grippers has ceased.

25. In a printing machine, the combination with a plurality of type wheels having type rows thereon, and a setting member therefor, driving connections between the latter and each of the type wheels, releasing mechanism movable with the setting member having a step by step relative movement thereto for the purpose of successively interrupting the driving connections, a platen, an operating member for causing engagement of the type wheels and platen, and a spring actuated locking device for the operating member, movable out of the path of the latter when the releasing mechanism has been moved to disengage all the driving connections, and the setting member occupies a certain position.

26. In a printing machine, the combination with a plurality of type wheels having type rows thereon, and a centering mechanism therefor, of a setting member, driving connections between the latter and each of the type wheels, releasing mechanism for coöperating with the driving connections for the purpose of successively disconnecting the type wheels from the setting member, a platen, an operating member for causing engagement of the type wheels and platen, and a spring actuated locking device for the operating member, movable out of the path of the latter when the releasing mechanism has been moved to disengage all the driving connections, and the type wheels are properly positioned by the centering mechanism.

27. In a printing machine, the combination with a series of type carriers, of a manually operable member, means controlled by said member for differentially setting the various type carriers and for connecting and disconnecting the type carriers and the member, and indicating devices for indicating the carriers connected and disconnected.

28. In a printing machine, the combination with a series of type carriers, of a manually operable member common to the type carriers, means controlled by said member for successively and differentially setting the various type carriers and for connecting and disconnecting the type carriers and the member, a manipulative device for each type carrier, and correcting mechanism rendered effective by said manipulative devices.

29. In a printing machine, the combination with a set of type carriers and a setting member common thereto, of devices normally connecting the type carriers to the setting member, cams movable relative to the setting member to disable the connecting devices, and means actuated by the setting member for imparting said relative movements to the cams.

30. In a printing machine, the combination with a set of type carriers and a setting member common thereto, of means comprising a set of normally effective dogs connecting the type carriers and setting member, devices controlled by the setting member for successively rendering the dogs ineffective, a set of keys, and means controlled by the keys for restoring any desired dog to effective condition.

31. In a printing machine, the combination with a set of type carriers and a setting member common thereto, of means comprising a set of dogs normally connecting the type carriers and the setting member, and devices controlled by the setting member for successively operating the dogs to disconnect the type carriers from the setting member.

32. In a printing machine, a set of type carrier, a manually operable member, intervening mechanism for connecting and disconnecting the type carriers and said member to effect differential adjustment of the carriers to set up items by operations of the member, and correcting mechanism requiring operation of the member to change the setting of an incorrectly set carrier.

33. In a printing machine, the combination with a set of type carriers, of a setting member common to the carriers, normally effective connections for transmitting movements of the setting member simultaneously to the type carriers, means for successively rendering the connections ineffective, a manipulative device associated with each type carrier, and mechanism controlled jointly by the aforesaid means and said manipulative devices for restoring the connection for any desired type carrier to effective condition.

34. In a printing machine, the combination with a printing couple, of means comprising an invariably moved element for bringing the members of the couple together to print, a work table movable from a work receiving to a printing position, stop devices adjustable to limit differentially the extent of the movements of the table, and means for effecting said movements of the table by movement of the invariably moved element.

35. In a printing machine, the combination with a printing couple, of means comprising an invariably moved element for bringing the members of the couple together to print, a work table movable from a work receiving to a printing position, stop devices adjustable to arrest the table in different printing positions, and means comprising a spring for moving the table by movement of the invariably moved element.

36. In a printing machine, a set of independently adjustable type carriers each carrying a plurality of word type lines extending full width thereof, said type lines being graduated in height from one end to the other, and adjusting mechanism comprising gear teeth engaging the type carriers between the type lines.

37. In a printing machine, the combination with a non-adjustable logotype, of a series of type carriers each provided with a plurality of type forms for printing the various words used in writing monetary values, said carriers being successively adjustable, starting with the carrier nearest the non-adjustable carrier, to set up in alinement with said non-adjustable carrier the type forms for the matter to be printed, and type carrier setting mechanism comprising devices controlling said successive adjustment of the carriers.

38. In a printing machine, the combination with a series of type carriers, of a manually operable member, mechanism controlled by said member for adjusting the type carriers to set up the matter to be printed, devices for taking impressions from the type carriers, locking mechanism normally effective to prevent operation of the impression devices, and devices controlled by the manually operable member for rendering the locking mechanism ineffective after the matter to be printed has been set up on the type carriers.

39. In a printing machine, the combination with a series of type carriers, of a manually operable member, mechanism controlled by said member for adjusting the type carriers to set up the matter to be printed, devices for taking impressions from the type carriers, locking mechanism normally preventing operation of the impression devices, and devices controlled by the manually operable member for releasing said locking mechanism and thereby freeing the impression devices for operation.

40. In a printing machine, the combination with a plurality of type wheels and a setting member common thereto, of a clutch connecting each of the type wheels with the setting member for movement by operation of said members, means controlled by the setting member for successively operating the clutches to disconnect the type carriers from the member, devices for taking impressions from the type carriers, and locking mechanism controlled by the clutch releasing means for preventing operation of the impression devices until all of the clutches are disconnected.

41. In a printing machine, the combination with a plurality of type carriers, of a setting and controlling member common thereto, clutch mechanism normally connecting the type carriers with the setting member for simultaneous movement by operation of said member, means controlled by the member for operating the clutch mechanism to successively disconnect the type carriers to leave said carriers set in the desired printing positions, devices for taking impressions from the type, locking mechanism normally preventing operation of the impression devices, and means requiring operation of the clutch mechanism to disconnect all of the type to release said locking mechanism and thereby free the impression devices for operation.

WALTER B. PAYNE.